United States Patent
Jaaskelainen et al.

(10) Patent No.: US 12,001,067 B2
(45) Date of Patent: Jun. 4, 2024

(54) METHOD AND SYSTEM FOR DETECTING ONE OR MORE PROPERTIES, POSITIONING, AND MINIMIZING TENSION OF A WAVEGUIDE

(71) Applicant: Halliburton Energy Services, Inc., Houston, TX (US)

(72) Inventors: Mikko K. Jaaskelainen, Houston, TX (US); Michel Leblanc, Houston, TX (US); Kwang Il Suh, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 49 days.

(21) Appl. No.: 17/873,933

(22) Filed: Jul. 26, 2022

(65) Prior Publication Data
US 2024/0036274 A1 Feb. 1, 2024

(51) Int. Cl.
*E21B 47/09* (2012.01)
*G02B 6/42* (2006.01)
*G02B 6/50* (2006.01)
*G02B 6/54* (2006.01)

(52) U.S. Cl.
CPC ............ *G02B 6/4227* (2013.01); *E21B 47/09* (2013.01); *G02B 6/50* (2013.01); *G02B 6/54* (2013.01)

(58) Field of Classification Search
CPC .......... G02B 6/4227; G02B 6/50; G02B 6/54; E21B 47/09
See application file for complete search history.

(56) References Cited

U.S. PATENT DOCUMENTS

| | | | | |
|---|---|---|---|---|
| 5,029,816 A | * | 7/1991 | Langston | G02B 6/50 254/134.3 FT |
| 5,182,779 A | * | 1/1993 | D'Agostino | G01D 5/353 16 385/13 |
| 7,404,416 B2 | | 7/2008 | Schultz et al. | |
| 8,789,585 B2 | * | 7/2014 | Leising | E21B 47/00 385/12 |
| 10,538,980 B2 | | 1/2020 | Jaaskelainen | |
| 10,550,654 B2 | | 2/2020 | Jaaskelainen | |
| 10,705,242 B2 | | 7/2020 | Jaaskelainen et al. | |
| 10,795,109 B2 | | 10/2020 | Benjamin et al. | |
| 11,131,185 B1 | | 9/2021 | Jaaskelainen et al. | |

(Continued)

FOREIGN PATENT DOCUMENTS

| | | |
|---|---|---|
| WO | 2018118046 A1 | 6/2013 |
| WO | 2018070980 A1 | 4/2018 |

(Continued)

OTHER PUBLICATIONS

Foreign Communication from Related Application—International Search Report and Written Opinion of the International Searching Authority, International Application No. PCT/US2022/038756, dated Apr. 19, 2023, 11 pages.

(Continued)

*Primary Examiner* — Steven A MacDonald
(74) *Attorney, Agent, or Firm* — Conley Rose, P.C.; Rodney B. Carroll

(57) ABSTRACT

A method, includes: detecting one or more properties of a waveguide having a downhole end and an uphole end; and responsive to the detected one or more properties, positioning into a passage of a wellbore the waveguide to minimize tension thereof.

20 Claims, 10 Drawing Sheets

(56) References Cited

U.S. PATENT DOCUMENTS

| | | | |
|---|---|---|---|
| 11,168,543 B2* | 11/2021 | Purkis | E21B 19/00 |
| 2005/0045343 A1* | 3/2005 | Bixenman | H02G 1/086 |
| | | | 166/385 |
| 2006/0165344 A1* | 7/2006 | Mendez | G01L 11/025 |
| | | | 385/13 |
| 2011/0100642 A1 | 5/2011 | Cens et al. | |
| 2012/0085531 A1* | 4/2012 | Leising | E21B 47/00 |
| | | | 166/77.2 |
| 2013/0160995 A1 | 6/2013 | Ocalan et al. | |
| 2014/0010671 A1* | 1/2014 | Cryer | B60K 6/485 |
| | | | 290/45 |
| 2014/0260588 A1 | 9/2014 | Jaaskelainen et al. | |
| 2014/0291499 A1* | 10/2014 | Mathieu | E21B 43/28 |
| | | | 250/254 |
| 2014/0318769 A1* | 10/2014 | Walton | E21B 47/09 |
| | | | 166/250.12 |
| 2014/0374119 A1 | 12/2014 | Dewars et al. | |
| 2015/0075783 A1 | 3/2015 | Angman et al. | |
| 2016/0003648 A1 | 1/2016 | Barfoot et al. | |
| 2016/0024902 A1* | 1/2016 | Richter | E21B 47/00 |
| | | | 166/250.01 |
| 2016/0153276 A1 | 6/2016 | Park et al. | |
| 2016/0265345 A1 | 9/2016 | In'T Panhuis et al. | |
| 2017/0138179 A1 | 5/2017 | Jaaskelainen et al. | |
| 2017/0205260 A1 | 7/2017 | Jaaskelainen et al. | |
| 2017/0241831 A1 | 8/2017 | Jaaskelainen | |
| 2017/0342822 A1* | 11/2017 | Wilson | E21B 47/135 |
| 2018/0266240 A1 | 9/2018 | Jaaskelainen et al. | |
| 2018/0328120 A1* | 11/2018 | Therrien | E21B 43/119 |
| 2019/0010803 A1* | 1/2019 | Purkis | E21B 23/14 |
| 2021/0047896 A1 | 2/2021 | Arabskyy et al. | |
| 2021/0238984 A1* | 8/2021 | Maida, Jr. | G01K 11/324 |
| 2021/0372213 A1 | 12/2021 | Park et al. | |

FOREIGN PATENT DOCUMENTS

| | | |
|---|---|---|
| WO | 2020102534 A1 | 5/2020 |
| WO | 2022048885 A1 | 3/2022 |

OTHER PUBLICATIONS

"Precision Wound Spools," Linden Photonics, Dec. 30, 2021, 3 pages, Linden Photonics, Inc.

Filing Receipt, Specification and Drawings for U.S. Appl. No. 17/492,097, entitled "Distributed Acoustic Sensing Systems and Methods With Dynamic Gauge Lengths," filed Oct. 1, 2021, 68 pages.

Filing Receipt, Specification and Drawings for U.S. Appl. No. 17/667,108, entitled "Marine Animal Monitoring During Seismic Surveying Using Distributed Acoustic Sensing," filed Feb. 8, 2022, 36 pages.

Filing Receipt, Specification and Drawings for U.S. Appl. No. 17/873,933, entitled "Method and System for Detecting One or More Properties, Positioning, and Minimizing Tension of a Waveguide," filed Jul. 26, 2022, 61 pages.

Foreign Communication from Related Application—International Search Report and Written Opinion of the International Searching Authority, International Application No. PCT/US2022/035958, dated Mar. 24, 2023, 9 pages.

First Office Action dated Oct. 4, 23 (22 pages), U.S. Appl. No. 17/850,438, filed Jun. 27, 2022.

* cited by examiner

METHOD AND SYSTEM FOR DETECTING ONE OR MORE PROPERTIES, POSITIONING, AND MINIMIZING TENSION OF A WAVEGUIDE

TECHNICAL FIELD

Embodiments of the disclosure are directed to detecting one or more properties of a waveguide. More particularly, embodiments of the disclosure are directed to positioning the waveguide and minimizing tension and subsequent damage thereof.

BACKGROUND

Disposable fibers can be pumped into monitoring wells to provide a cost-efficient detection of micro-seismic and strain events caused by activities, e.g., a hydraulic fracturing job. Optical fibers disposable after deployment can often be off-the-shelf telecommunication grade fibers, and usually are not as durable as, e.g., cabled fibers. The disposable dart with the optical fiber coils may be dropped into a well where gravity allows the dart to sink until the dart eventually can stop at a deviated part of the well due to friction. Fluid may then be pumped from the surface to propel the dart to the toe of the well. Optionally, pumping may also begin before the dart reaches the bottom of the vertical section.

Often, optical fibers can break from time to time during fiber deployment. Generally, minimizing fiber breaks is desirable due to the cost of disposable fiber assemblies as well as time lost on location where labor, fracturing equipment and stand-by costs quickly accumulate. Breakage can occur due to excessive tension or strain. Excessive tension or strain can not only result in a damaged or broken optical fiber, but excessive tension or strain can interfere by creating "noise" interfering with detecting strain measurements in surrounding formations. Thus, a system and method that minimizes downhole optical fiber tension to improve strain measurements and avoid breakage is desirable.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
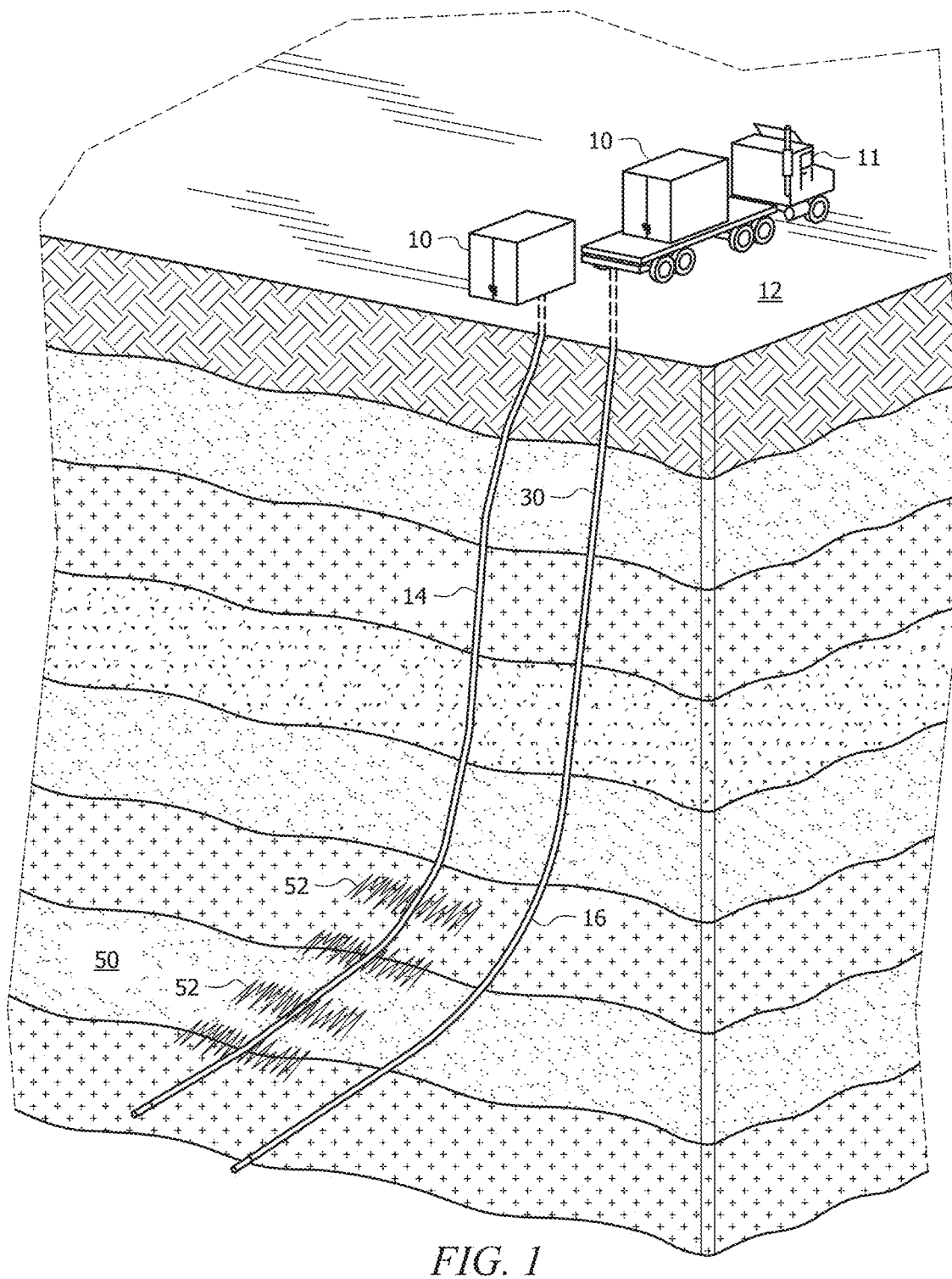
FIG. 1 illustrates an exemplary arrangement of wells communicating one or more fluids with or from a subterranean formation in accordance with embodiments of the present disclosure.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

Substantially similar or identical elements in the drawings may be identified by the same numeral to reduce redundancy.

As used herein, the term "vertical" can mean a direction orientated substantially perpendicular to the horizon or within about 20 degrees of perpendicular.

As used herein, term "horizontal" can mean a direction skewed from vertical in any direction, and may include a direction parallel to the horizon.

As used herein, the term "deployed" can mean an object being moved downhole.

As used herein, the term "retracted" can mean an object being moved uphole, i.e., reverse deployment.

As used herein, the term "positioning" can mean deploying, retracting, or otherwise moving, such as laterally, an object at any rate.

As used herein, the terms "tension" and "strain" may be used interchangeably.

As used herein, the term "fluid path" can be a passage formed by a wellbore and can be used for the production of fluids, such as hydrocarbons and water, or be used for the injection of fluids, such as water, carbon dioxide, and natural gas, e.g., methane.

As used herein, the term "wellbore distance" can mean the length of wellbore forming a passage.

As used herein, the term "coupled" can mean two items, directly or indirectly, joined, fastened, associated, connected, communicated, or formed integrally together either by chemical or mechanical means, by processes including extruding, stamping, molding, or welding. What is more, two items can be coupled by the use of a third component such as a mechanical fastener, e.g., a screw, a nail, a staple, or a rivet; an adhesive; or a solder.

As used herein, the term "and/or" can mean one or more from a list of items, such as "A and/or B" means "A, B, or the combination of A and B".

As used herein, there terms "at least one of A or B" should be understood to mean "only A, only B, or both A and B."

The present disclosure generally relates to deploying a waveguide and minimizing tension during and after deployment to reduce damage and detection interference to the waveguide. Disposable waveguides can be deployed, and although disposable, generally longer waveguide life is preferable. Monitoring the waveguide itself and taking active steps to reduce tension in the waveguide can increase service life and improve detection of surrounding formation strain by reducing interfering tension present in the waveguide itself.

In some embodiments, knowing point and distributed flow allocation along wellbores can be highly desirable. Usually, current down-hole flow meters can be expensive and require investment in advance in order to incorporate power and communications infrastructure required to support the sub-surface flow meters. Similarly, distributed fiber optic sensing where the sensing cable may be placed behind the casing during run-in-hole (RIH) can often require substantial upfront costs and in many cases increased due diligence and care before and during drilling and completion operations. Typically, operators commit to fairly significant upfront costs for sensing in addition to the well construction cost, and this expense can limit deployment of subsurface sensing systems.

In some embodiments, operators often deploy subsurface sensing systems, and the most common sensing system can be pressure and temperature (P/T) sensing systems or down-hole pressure gauges. Both electrical and optical versions can exist. In some embodiments, one advantage of optical pressure gauges is that the telemetry fiber can be used for distributed sensing or spare waveguides can be added to the deployed cable. P/T gauges can provide valuable information but typically do not provide flow rates.

Disposable waveguides, such as optical fibers, may be pumped into a well without any knowledge of fiber tension during or post deployment. The well can be a treatment well, used for producing and/or injecting fluids, or an observation well proximate to the treatment well for monitoring strain in the formation proximate to the treatment well. Actively monitoring fiber tension during and after deployment can allow for real-time actionable feedback and control of fiber tension to prevent damage thereof and minimize tension in the waveguide. Waveguide tension may obscure strain measurement in surrounding formations. Fluid flow rate along the at least one of tubing and casing can create drag on the waveguide and the cumulative drag may create fiber tension. Uneven flow rate may create acceleration and deceleration in the waveguide resulting in tension changes, such as peaking and cresting, thereby damaging the waveguide. A damaged waveguide may not provide proper detection. Minimizing flow rate variance may control the fluid flow rate to reduce waveguide tension and the damage resulting therefrom. Active fiber tension measurements can enable control of the pump to maintain fiber tension below damage thresholds.

Eliminating any excess fiber tension can reduce the risk of fiber coating damage and extend the service life of the waveguide. In some embodiments, excess tension can occur due to pumping fluids down the wellbore creating excess waveguide drag in the vertical section of the wellbore. As additional fiber is deployed, the more distributed drag acts on the waveguide as the dart proceeds to the toe of the well. Also, the higher the fluid pump velocity can correspond to higher drag, and in some embodiments, the fiber drag can result in fiber breakage.

In some embodiments, deployment methods may include grease or similar sticky material on the waveguide such that the fiber may adhere to the inner wall of the casing or tubing. The fiber may not re-distribute immediately when additional friction or adhesion is present along the fiber so the distributed tension profile can be measured along the fiber in order to ensure that the waveguide is free of tension or at a minimum tension to avoid fiber breakage.

In some embodiments, the waveguide can also contact the inside wall of the casing, and additionally, a capstan effect may occur as the fiber is pumped around the heel section of the well. Particularly, some remnant fiber tension can be locked in the vertical section due to the capstan effect. In addition, when the fiber in the vertical section of the well is under tension, the stored energy may randomly be released over time, creating noise in strain data collected obscuring detecting strain in surrounding formations.

Also, fiber movement around the heel may damage the waveguide coating to expose the waveguide cladding to wellbore fluids. Uneven fluid drag may move the fiber over sharp surfaces with associated coating damage and fiber scratches developing into cracks. Fiber cracks can propagate faster when the fiber is in tension and exposed to a fluid, such as a water, at elevated temperatures. Often, the disposable fiber can be a dual acrylate coating that may be damaged due to the deployment method and/or the wellbore environment, which can include corrosive fluids at high temperature. Hence, minimizing fiber tension, as any scratch on the fiber cladding may rapidly grow to a crack when a fiber is exposed to fluids, e.g., water, at high temperatures under tension, can be desirable.

In some embodiments, a system and a method can include one or more of the following steps: 1) measure fiber properties in real-time of the fiber coil in the disposable fiber deployment tool; 2) measure tension during deployment (peak and/or distributed); 3) measure tension post deployment (peak and/or distributed); 4) active control using real-time measurements of pumps to control flow to avoid peak or excess fiber tension during the tool deployment; and 5) relieving post deployment tension using real-time measurements in order to avoid fiber breakage due to tension or excess "noise" interfering with detection. In any embodiment, the properties of the waveguide itself is being monitored and process changes can be made to reduce or minimize waveguide tension.

The waveguide tension can be monitored during deployment using electrical and/or optical sensors. Single point sensors may be located at the surface end of the deployment tool to measure maximum fiber tension where single point sensors may, e.g., be strain gauges or Fiber Bragg Grating (FBG) based inline sensors. The FBG can be spliced into the waveguide at the disposable fiber deployment head or inscribed into the fiber during the fiber manufacturing. In some embodiments, electrical strain gauges can similarly be placed in the disposable fiber deployment head and coupled to the sensing fiber. In some embodiments, an existing tool can be modified to include single point sensors. In any embodiment, distributed fiber optic sensing (DFOS) may use, e.g., distributed acoustic sensing (DAS) and/or distributed temperature sensing (DTS) and/or distributed strain sensing (DSS) optionally with a point pressure and temperature (P/T) gauge that may be used to model flow distributions along wellbores.

In some embodiments, distributed fiber sensing systems, e.g., DSS, discussed above, and/or DAS systems, may be used with an existing tool without modifications. Distributed sensing systems can provide peak and distributed data used to determine fiber conditions. In any embodiment, distributed waveguide measurements can provide detail over time and distance that can enable a better optimization and understanding of potential deployment related issues that single point surface sensors may be unable to provide.

By measuring fiber peak tension, deployment of the waveguide can be controlled by, e.g., regulating the pump rate during deployment and tension post deployment, in order to avoid excessive fiber tension and breakage.

In some embodiments, contemporaneous optical monitoring can use strain sensing techniques based on, e.g., Rayleigh and/or Brillouin scattering, or Fiber Bragg Gratings. In some embodiments, a load sensor can be configured to measure the tension in the waveguide at the wellhead. The waveguide can be exposed to different environments when located inside the fiber coil in a waveguide conveyor versus deployed in the wellbore. The static and dynamic strain can be different and can enable multiple measurements, namely, i) contemporaneously, ii) transition between the deployed fiber and coiled fiber, and iii) turbulent flow immediately behind the waveguide conveyor.

The waveguide may be interrogated using a DAS system during deployment where various downhole events may be measured. The flow meters may have orientation sensors, e.g., accelerometers, to enable orientation measurements where the measured orientation can be acoustically transmitted where the waveguide acts as a monitoring device interrogated by the DAS system.

In any embodiment, the maximum fiber tension i) can be measured contemporaneously, and this data can be used to control pump rates to limit fiber tension within desirable values. Peak and average fiber strain (or tension) values can be measured, filtered and used for controls.

In any embodiment, the transition ii) between the deployed fiber and coiled fiber can provide a measured strain profile. In some embodiments, the waveguide in the bobbin or spool follows a flat profile, only slightly affected by temperature changes, whereas the deployed fiber may indicate a strain gradient. This boundary can be contemporaneously tracked allowing for dart location as well as a velocity measurement. These parameters can be used to control pumps to avoid rapid flow rate changes, i.e., acceleration, while optimizing deployment velocity in order to minimize time on location. It is also desirable to prevent stoppage of the dart, as re-initiating movement may result in unwanted, excessive acceleration.

In any embodiment, the effect of turbulent flow iii) can be determined by measuring the span of fiber at the spool that can be undergoing rapid and random dynamic strain change. The length of the fiber under such condition can be used as a direct indicator of the extent of the force that the turbulent flow can have on the fiber and therefore can be correlated to the likelihood of fiber break due to excessive movement. This data can be used to further control pumps to maintain optimal flow rate for a safe level of turbulence.

In some embodiments, the waveguide can be actively monitored contemporaneously and controlled during deployment by regulating pump speed and fluid flow to limit fiber damage to extend waveguide service life. In some embodiments, pumps can control the desired fluid flow range such that gear shift changes are tightly controlled to avoid rapid fluid flow changes to prevent fluid flow induced strain transfer to the waveguide. In this manner, the pump fluid flow can be controlled within limits and minimize variability to, in turn, minimize change in velocity and acceleration and deceleration. In any embodiment, electrical pumps with, e.g., variable frequency drive (VFD) or other suitable mechanisms for controlling the electrical pump may achieve a smooth and well controlled fluid flow to minimize acceleration and/or deceleration changes and accompany waveguide tension. In some embodiments, active measurements of the disposable fiber dart velocity and location as the dart transitions from a gravity-based deployment to a fluid-propelled deployment can then be used to maintain a steady fiber deployment rate while avoiding excess fiber tension.

In some embodiments, the disposable fiber dart can be dropped into the well and the pump operator can either wait until the disposable fiber dart has landed in the heel or deviated section before commencing pumping in which case the fiber tension profile over time changes with associated dynamic tension peak values, or the pump operator can pump fluid while the disposable fiber dart also experiences gravity based forces thus potentially putting the fiber in excess tension before the disposable fiber dart can enter the horizontal well section.

In any embodiment, the tension can be reduced by releasing additional fiber from the surface once the disposable fiber dart has reached the desired location. In any embodiment, optional enhancements to extend the service life by reducing the remnant tension of the disposable fiber post-deployment. In some embodiments, the tension in the waveguide can affect the response of the disposable fiber to strain in the wellbore. Absent tension, the disposable fiber can detect the changes in the strain in the surrounding formation more precisely. The fiber can, over time, achieve an equilibrium in the wellbore and the fiber in the wellbore can be kept at the lowest possible tension to extend waveguide service life and to improve the tracking of strain changes in the wellbore, e.g., cross-well strain monitoring of the hydraulic fracturing of a nearby treatment well.

In any embodiment, remnant fiber tension can be reduced by, e.g., adding fiber length into the wellbore post-pumping while actively measuring the fiber tension. Optionally, a select length of fiber may be released once the pumping phase has been completed. In any embodiment, a second short spool on the deployment head can be provided where the second spool can be rotated to un-wind the waveguide once the disposable fiber dart pumping has been completed. The measured strain profile can confirm the amount of fiber needed to be released in order to eliminate, or sufficiently reduce, the tension in the waveguide. In any embodiment, similar information can be obtained using fiber tension measurement at the wellhead, albeit with additional assumptions made about the deployment of the waveguide.

In any embodiment, reverse the fluid flow for a short period of time can relieve the tension. The remnant tension can be measured in real-time, and the operation can be stopped once the tension is within acceptable limits.

In some embodiments, disposable fibers, such as a fiber sold under the trade designation ExpressFiber™ and flow meter technology from Haliburton Company of Houston, Texas may be used. In any embodiment, the fiber may be deployed using gravity in the vertical section and then pumped into the horizontal section of a wellbore. In some embodiments, the fiber may be deployed in the reverse direction, i.e., deploy the fiber coil to the toe of the well and release fiber as the coil is pulled out of the wellbore.

Additional features and advantages of the disclosed embodiments will be or will become apparent to one of ordinary skill in the art upon examination of the following figures and detailed description. It is intended that all such additional features and advantages be included within the scope of the disclosed embodiments. Further, the illustrated FIGS. 1-10 are only exemplary and are not intended to assert or imply any limitation with regard to the environment, architecture, design, or process in which different embodiments may be implemented.

Referring to FIG. 1, an exemplary arrangement of a treatment well 14 and an observation or monitoring well 16 can be communicating one or more fluids to or from a subterranean formation 50. In some embodiments, the treatment well 14 can be in communication with one or more fluids from formation fractures 52 in the subterranean formation 50. Usually, these fractures 52 can be created by any suitable method, such as hydraulic fracturing. The observation well 16 can be proximate to the treatment well 14 and have various tools inserted in a wellbore 30 for acoustically detecting, e.g., the fluid flow, in the treatment well 14. A surface 12 can have equipment thereon for monitoring and operating the wells 14 and 16, such as one or more fluid displacement devices 10, such as pumps 10. One pump 10 can be fixed on the ground at the surface 12 while the other pump 10 can be transportable by being supported by a vehicle 11, such as a truck and trailer.

Figure 2:
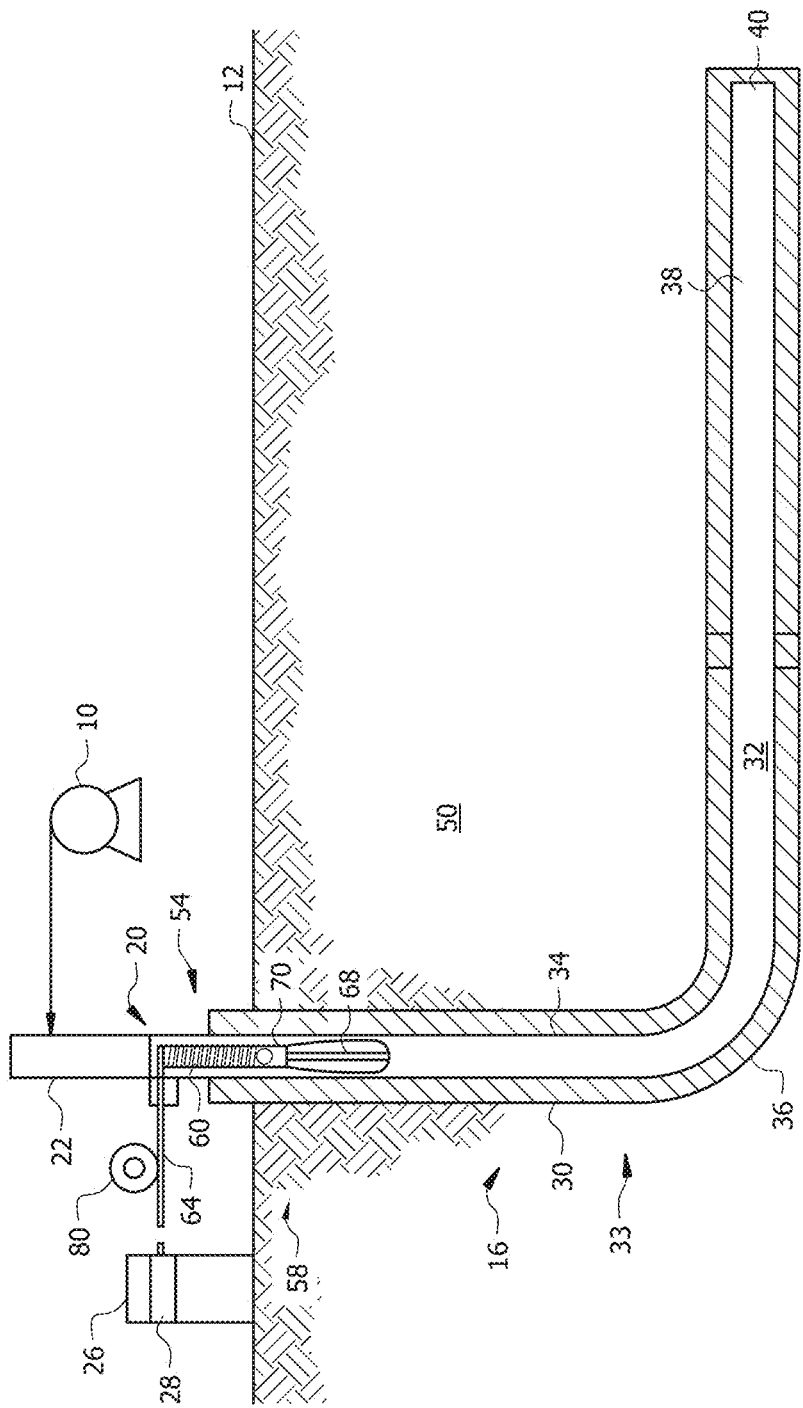
FIG. 2 illustrates an exemplary arrangement of a downhole tool in a first position of a wellbore for deploying a waveguide in accordance with embodiments of the present disclosure.
Figure 3:
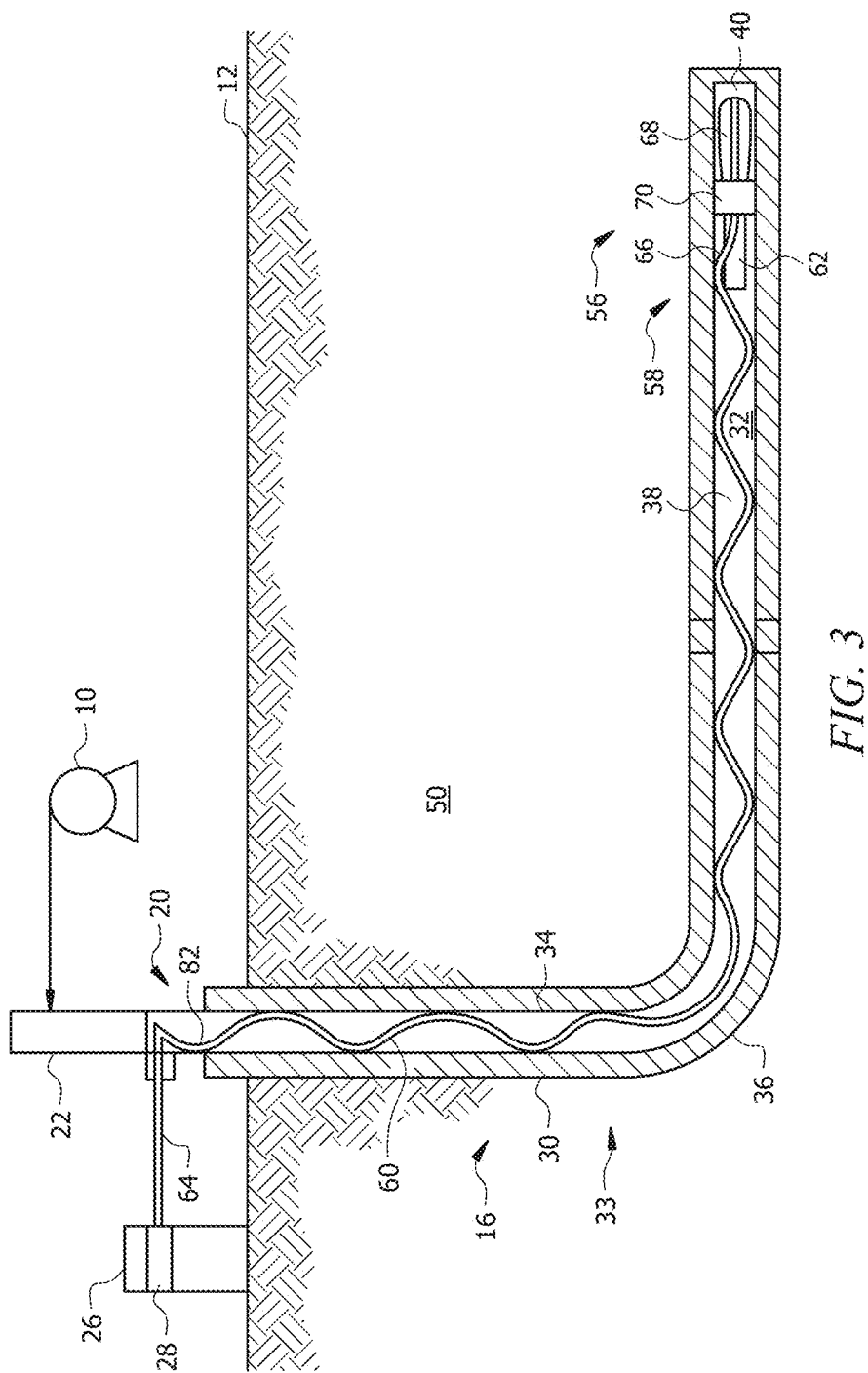
FIG. 3 illustrates an exemplary arrangement of a downhole tool in a second position of a wellbore with the waveguide deployed in accordance with embodiments of the present disclosure.

Referring to FIGS. 2-3, in some embodiments, a waveguide 60 can be deployed in a wellbore 30 of an observation well 16. Although an observation well 16 is depicted, it should be understood that the waveguide 60 can be deployed in any suitable well, including the treatment well 14, as depicted in FIG. 1. The wellbore 30 can surround a fluid production path 32 and have a heel 36 and a toe 40 in a subterranean formation 50, such as a subterranean fluid producing formation 50. A waveguide conveyor 58 can include the waveguide 60 wrapped around a spool 62 coupled to a dart 68 optionally with one or more swell cups 70. The waveguide conveyor 58 may initially be placed at the wellhead 20 below wellhead piping 22. An uphole end 64 of the waveguide 60 can be initially uncoupled to an instrument 28, such as an interrogator 28, of an instrument panel 26. The interrogator 28 can direct light into the waveguide 60 once connected.

Also, a fluid displacement device 10 can be at the surface 12. The fluid displacement device 10 may be a pump 10, such as an electric pump 10, with a variable frequency drive controlling a deployment (speed) between a minimum and a maximum velocity to regulate acceleration between minimum and maximum limits. The waveguide 60 may include a second inventory 80 of the waveguide 60 near the uphole end 64, as hereinafter described. The wellbore 30 can form the passage 32 having a substantially vertical portion 34 being a first location 34 and a substantially horizontal portion 38 or a second location 38. The substantially vertical portion 34 can form the heel 36 transitioning to the substantially horizontal portion 38 terminating at the toe 40 or a third location 40. As depicted in FIG. 2, the waveguide conveyor 58 can be at a first position 54 near the wellhead 20 at the surface 12. Subsequently, the waveguide conveyor 58 can be positioned at a second position 56 at the toe 40 or the third location 40, as depicted in FIG. 3. In other words, the dart 68 can be positioned at the first location 34, the second location 38, or the third location 40 in the passage 32 moving from the wellhead 20 to the toe 40.

In particular, in some embodiments, the waveguide conveyor 58 can deploy in the substantially vertical portion 34 with the dart 68 having sufficient weight to aid the deployment by dropping via gravity. Optionally, the fluid displacement device 10 may also pump down fluid, such as water. The waveguide 60 can deploy from the spool 62 from the back of the waveguide conveyor 58. After reaching the heel 36, the fluid displacement device 10 can pump fluid, such as water, down the wellbore 30 to propel the waveguide 60 through the substantially horizontal portion 38 to the toe 40. The swell cups 70 can swell acting as, e.g., a "sail", aiding the thrust of the waveguide conveyor 58 in the substantially horizontal portion 38. After the waveguide conveyor 58 reaches the toe 40, the waveguide can be connected to the instrument 28 at the uphole end 64 and extend to the toe 40 at the downhole end 66. If excessive tension exists in the waveguide 60, the second inventory of waveguide 60 can be released creating slack 82. This release of slack 82 can be regulated by a processor communicating with a controller, as hereinafter described.

In some embodiments, excessive tension can be created at various stages, which can damage the waveguide 60 or interfere with detecting strain in the surrounding subterranean formation 50. At a first stage, as the waveguide conveyor 58 travels downward in the substantially vertical portion 34, excessive tension can occur, e.g., at the spool 62. At a second stage, as the waveguide conveyor 58 travels along the substantially horizontal portion 38, excessive tension can be created in the substantially vertical portion 34, at the waveguide conveyor 58 in a turbulent region behind the spool 62, at the spool as the waveguide 60 unwinds, and during velocity variation creating excess deceleration and/or acceleration. Also, data can be obtained from the waveguide 60 regarding one or more waveguide 60 properties, including dynamic strain, peak tension, distributed tension, waveguide velocity, waveguide acceleration, or a combination thereof, that may be used to alter the deployment of the waveguide 60 in the passage 32. Particularly, the data may be processed and communicated to a controller 226 (as described hereinafter with respect to FIG. 10), in turn communicating with the fluid displacement device 10 and/or the second inventory 80 of the waveguide 60. After the waveguide conveyor 58 reaches the toe 40, excessive tension can occur in the substantially vertical portion 34 of the wellbore 30 due to the capstan effect as the waveguide 60 extends around the heel 36. Often, the waveguide 60 can be greased, and as the waveguide 60 exits the spool 62, the waveguide can adhere to the side of the wellbore 30. Thus, excessive tension in the waveguide 60 can interfere with detecting strain in the surrounding subterranean formation 50.

A few mitigation mechanisms can be used to minimize excessive tension. The waveguide conveyor 58 can be deployed a constant rate in the substantially vertical portion 34 and/or substantially horizontal portion 38 to minimize acceleration while preventing stoppage, which could then incur rapid acceleration to restart. The operation of the fluid displacement device 10 can be regulated to minimize the variability in velocity and/or acceleration and deceleration of the waveguide 60 during positioning, such as deploying from the wellhead 20 to the toe 40. In this manner, tension can be minimized in the waveguide 60 reducing the likelihood of damage or rupture. Also, after the waveguide 60 is deployed, the waveguide 60 may have excess tension at, e.g., the substantially vertical portion 34. In such an instance, additional inventory 80 of the waveguide 60 may be released creating the slack 82 to reduce tension, particularly in the substantially vertical portion 34.

Figure 4:
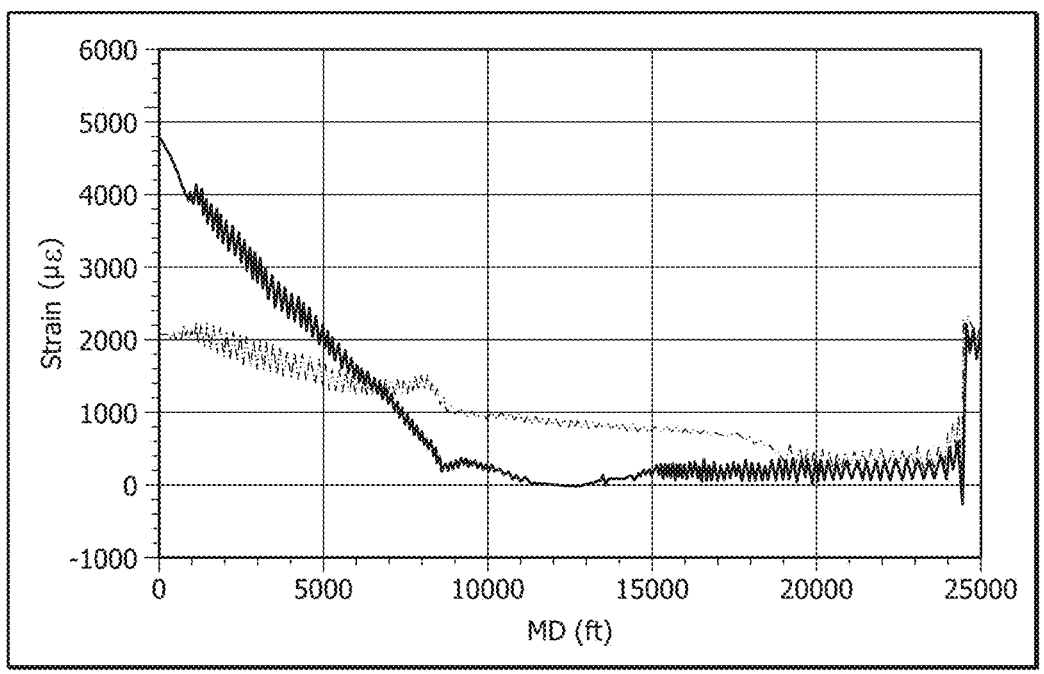
FIG. 4 is a graphical depiction of strain versus wellbore distance for a waveguide during gravity and fluid flow deployments.
Figure 5:
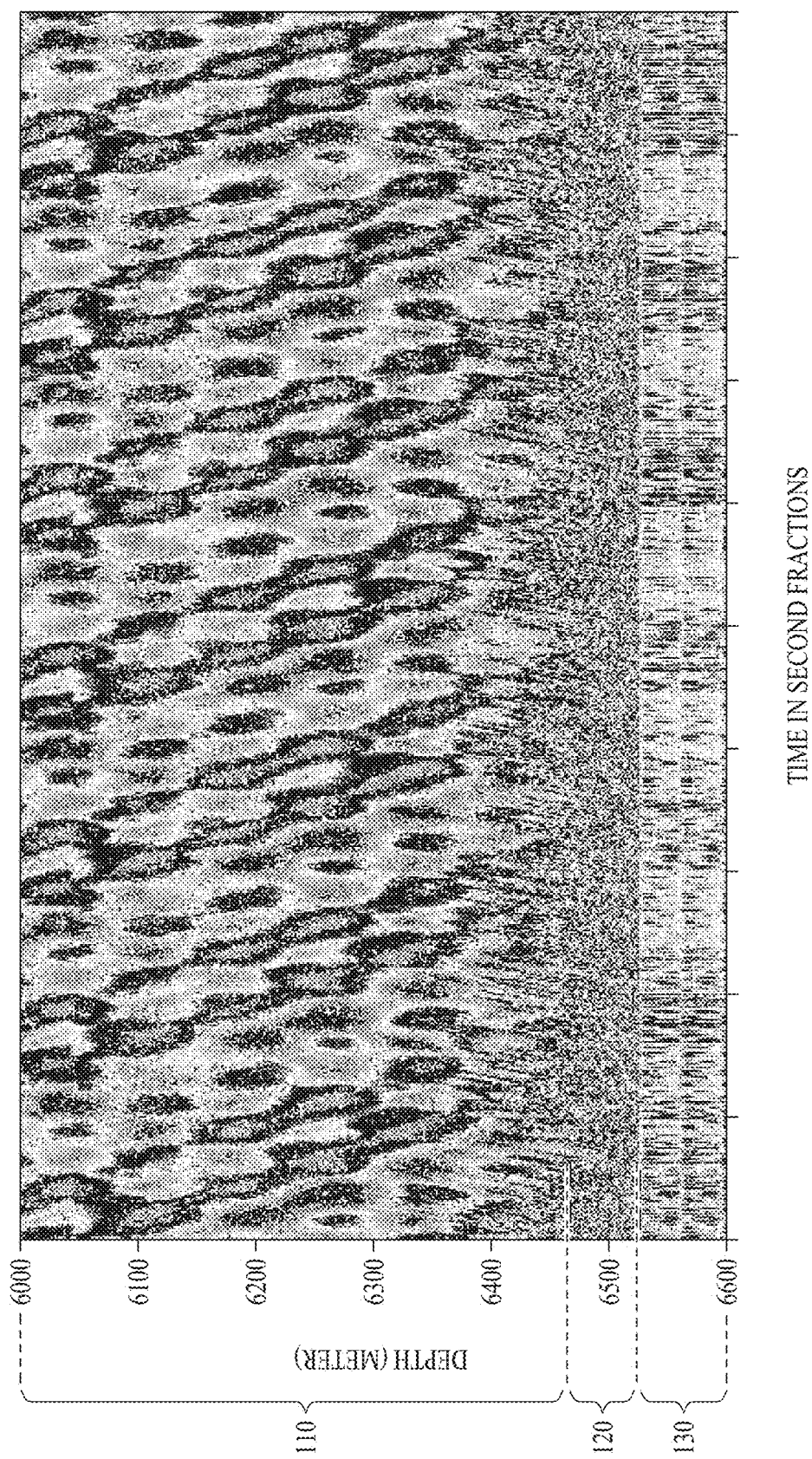
FIG. 5 is a graphical depiction of waveguide strain per wellbore depth versus time for different portions of a deployed waveguide.

An example in some embodiments is depicted in FIG. 4. Two stages are depicted, namely, a second stage in black and a third stage in gray using Brillouin scattering techniques, as discussed in further detail below. Particularly, the microstrain of a waveguide versus of a length of a wellbore along the passage is depicted. During the second stage, the waveguide can experience strain ε exceeding 1,000 microstrain (με) versus feet along the length of the wellbore during pumping due to the fluid drag force. Particularly, at the first location 34 in the substantially vertical portion 34. During the third stage after full deployment of the waveguide, tension can still exceed 1,000με in the substantially vertical portion 34 due to, e.g., the capstan effect. This strain, particularly above about 3,800με can damage or break the waveguide, particularly in an environment of high temperature and/or pressure in a water environment.

Referring to FIGS. 5-9, during the deployment, the wave guide 60, in some embodiments a disposable fiber, can exhibit three distinctive areas of dynamic strain as depicted at wellbore depth versus time in seconds using Rayleigh scattering techniques. Usually, these graphs can provide a snapshot of dynamic strain on the waveguide 60. In FIGS. 5-9, high strain is depicted in gray and lower strain is depicted with solid black. At the upper portion of the y-axis above the dashed lines in a region 110, the strain is depicted in the fiber deployed and outside the turbulent area. Between dashed lines in a region 120, strain is depicted of the fiber deployed in the turbulent area. Between the lower dashed line and the x-axis in a region 130, is the strain depicted in the spool. In some embodiments, the fiber still inside the spool is tightly coiled and therefore experiences less amount of strain movement and the strain movement is generally uniform across the entire span (except perhaps a certain periodic pattern based on the way the fiber is wound). The fiber that is already deployed tends to experience periodic movement caused by the traveling pressure wave up and down the well. The fiber that is just outside of the spool tends to experience the turbulence of the flow that is present near the spool and therefore can exhibit random and quite large magnitude of phase movement. Generally, it is desirable to reduce the strain to prevent damage to the waveguide during deployment.

Figure 6:
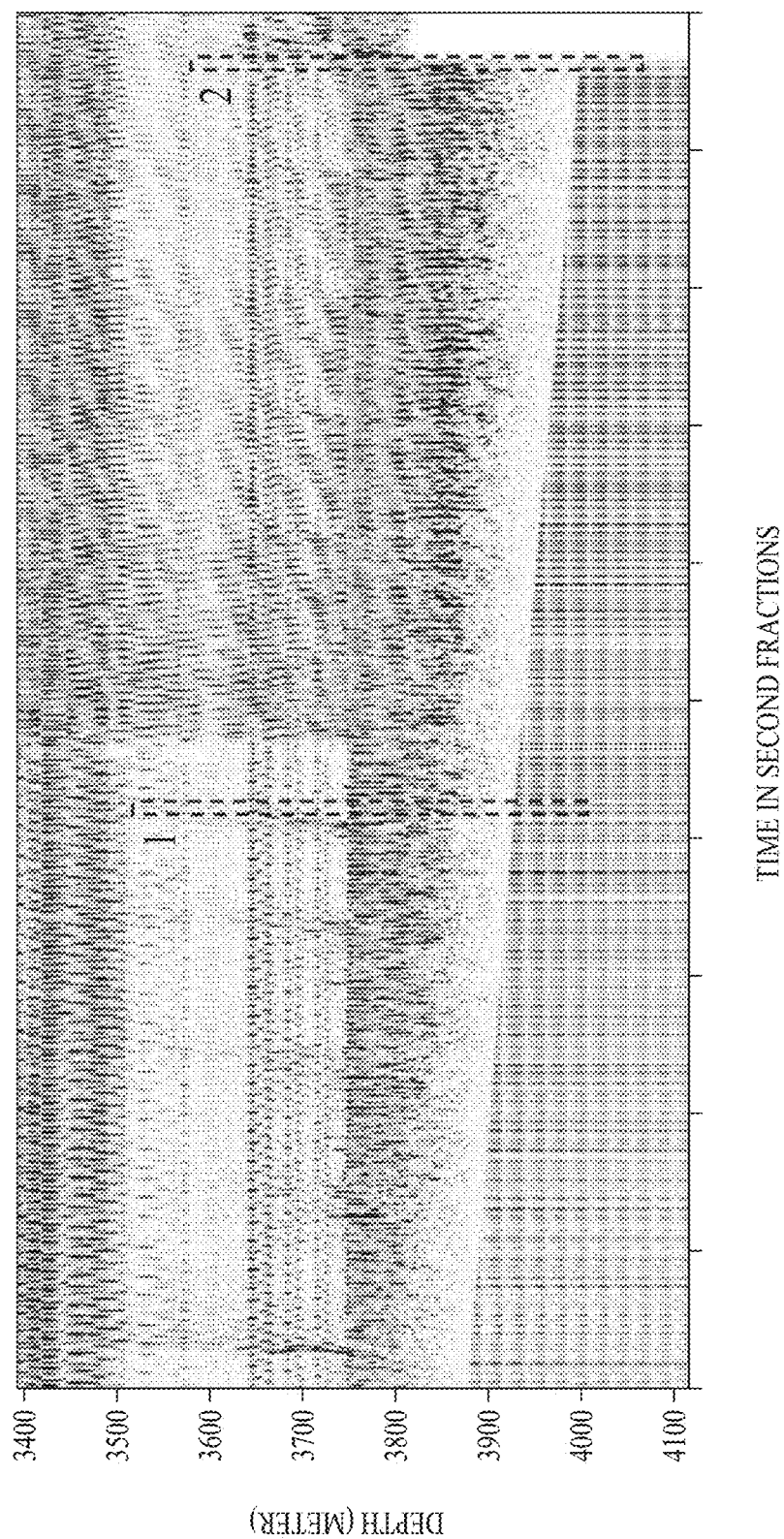
FIG. 6 is a graphical depiction of waveguide strain per depth versus time for different portions of a deployed waveguide.
Figure 7:
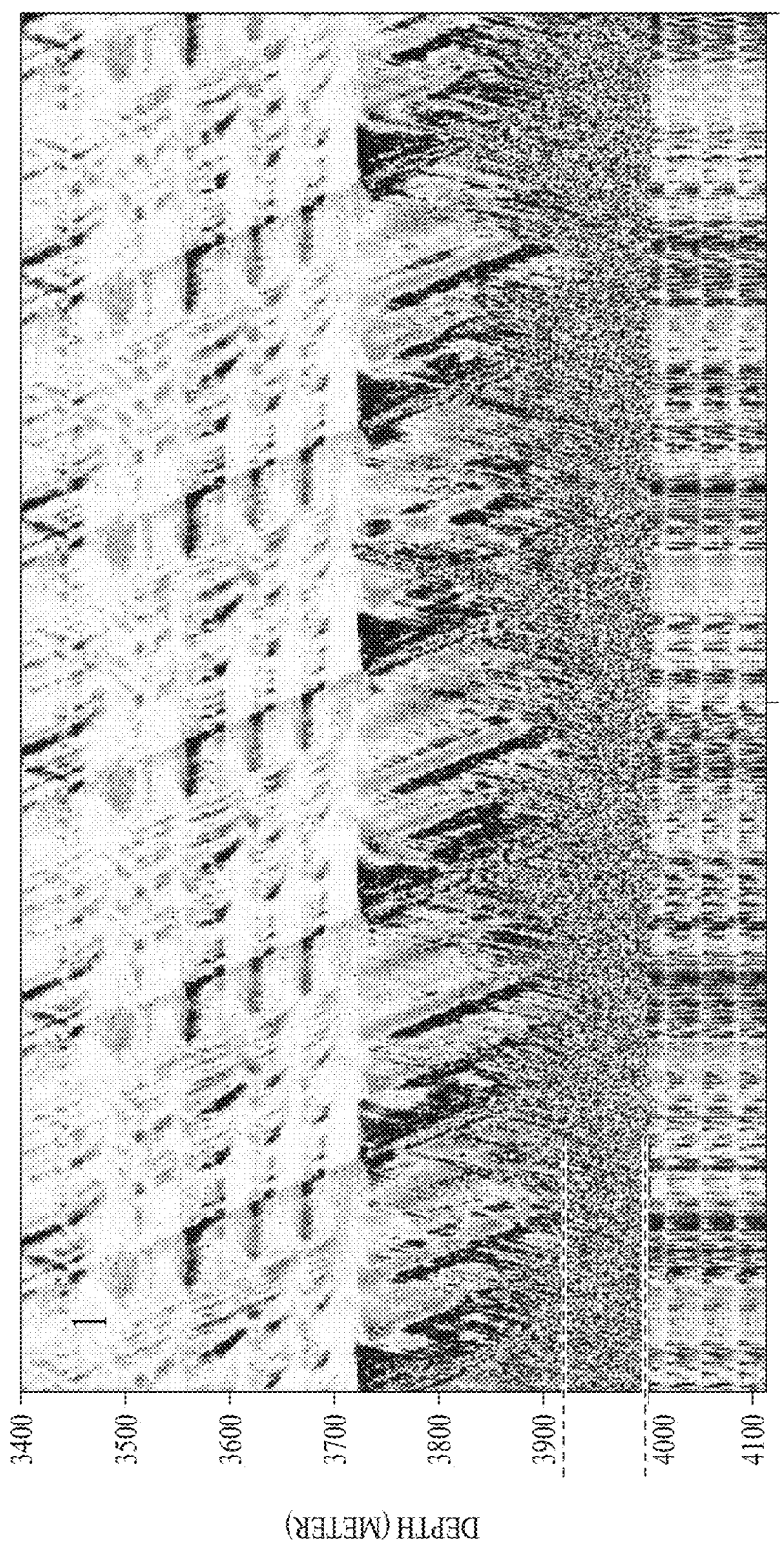
FIG. 7 is an enlarged view of "Area 1" of FIG. 6.
Figure 8:
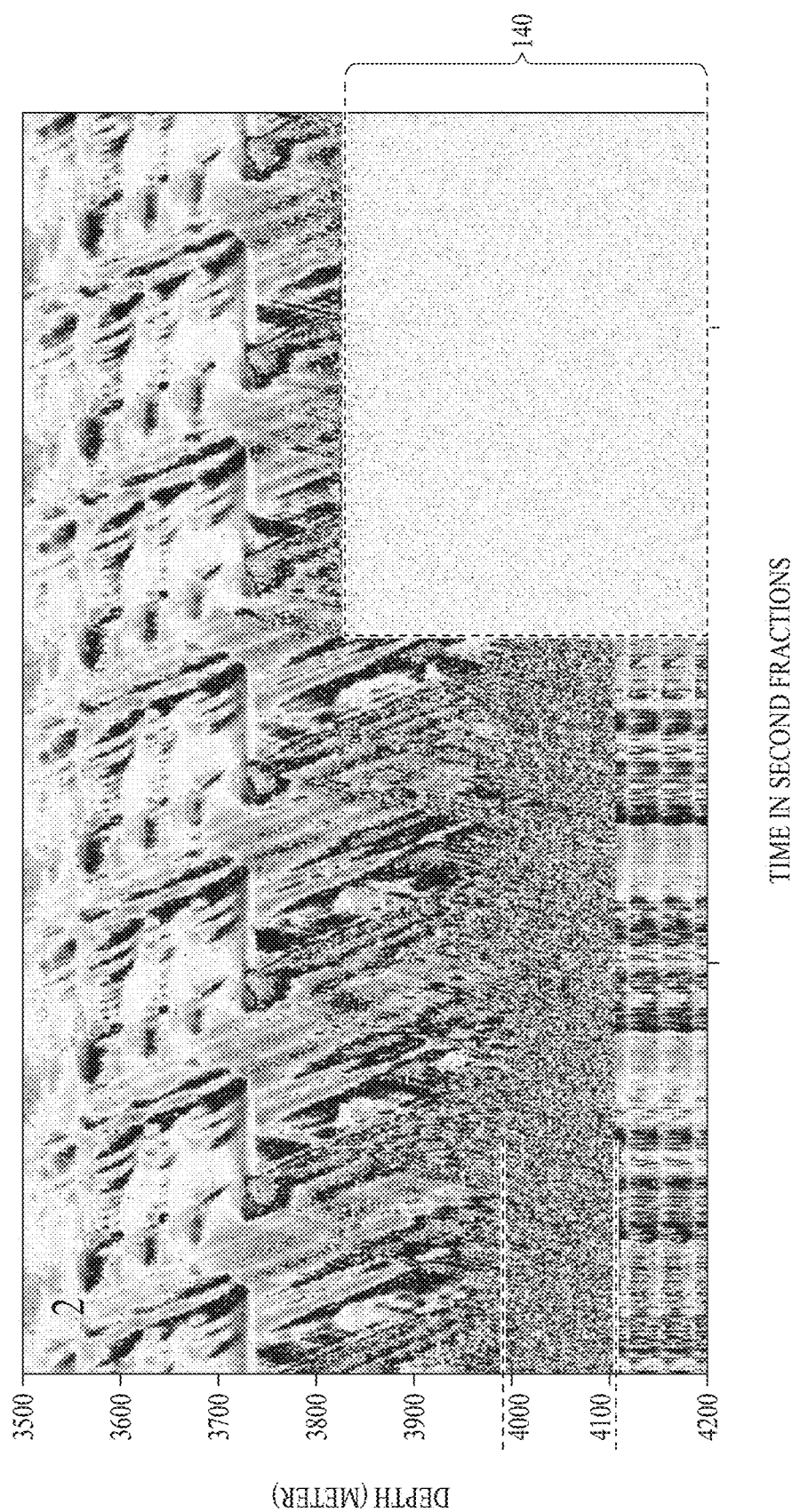
FIG. 8 is an enlarged view of "Area 2" of FIG. 6.

In FIGS. 6-8, the depth is plotted against time at, e.g., 10 kilohertz (kHz) and the data filtered in fractions of seconds to show the extent of the turbulent area that can be correlated. In this example, the severity of the dynamic strain movement that the fiber is exposed to, and therefore, the likelihood of the fiber break is depicted. FIGS. 6-8 depict an example showing an increase in turbulence before fiber break. Particularly, the white area to the right of the box "2" and in FIG. 8 at a region 140 shows the waveguide measurements after the waveguide breaks and the change in the extent of the turbulent area.

Figure 9:
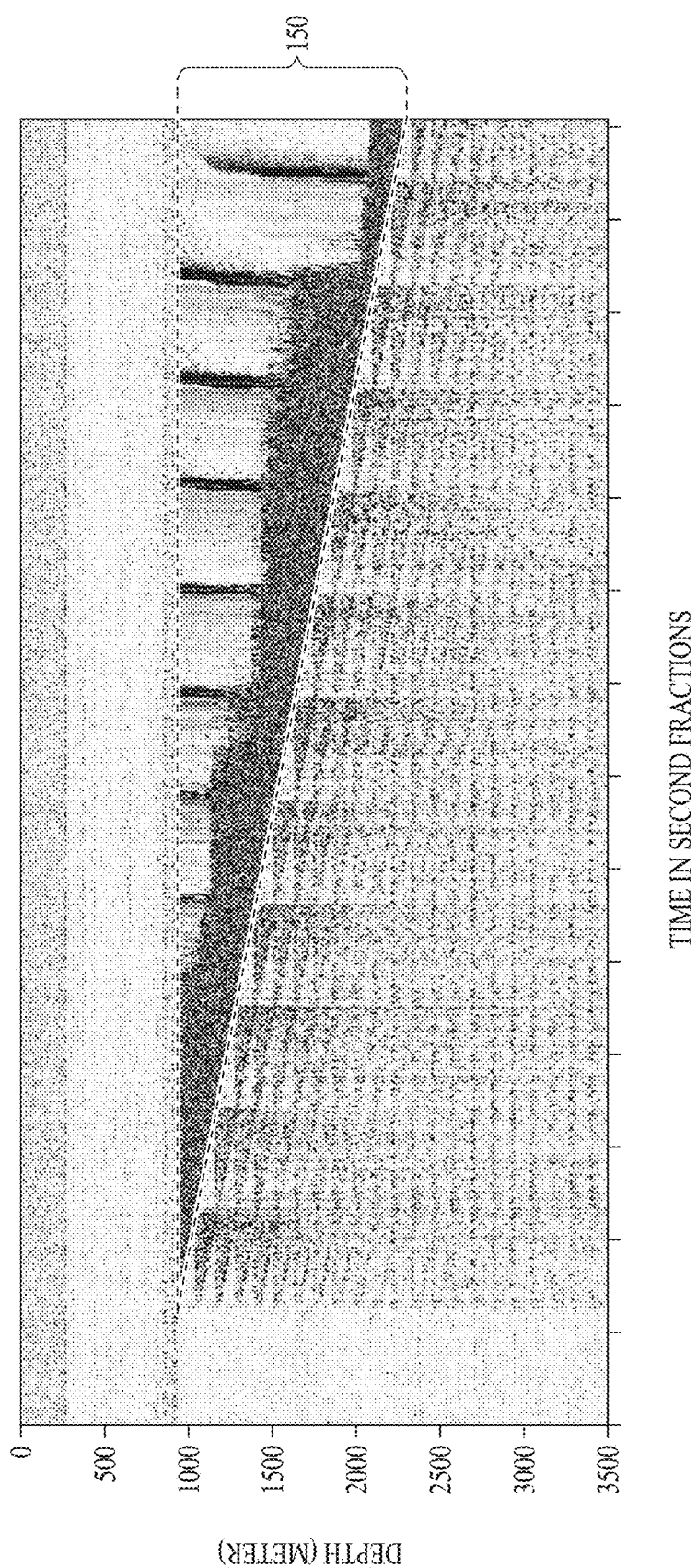
FIG. 9 is a graphical depiction waveguide strain per depth versus time for different portions of a deployed waveguide.

In FIG. 9, depth is plotted versus time in filtered time increments using Rayleigh scattering techniques. Any unusual activities such as sudden strain build-up and/or relief due sudden acceleration or deceleration that may cause structural degradation of the fiber. In FIG. 9, strain with spikes of tension and relaxation in the substantially vertical portion of the well bore is observed in a region 150 as the waveguide is deployed from the spool.

Figure 10:
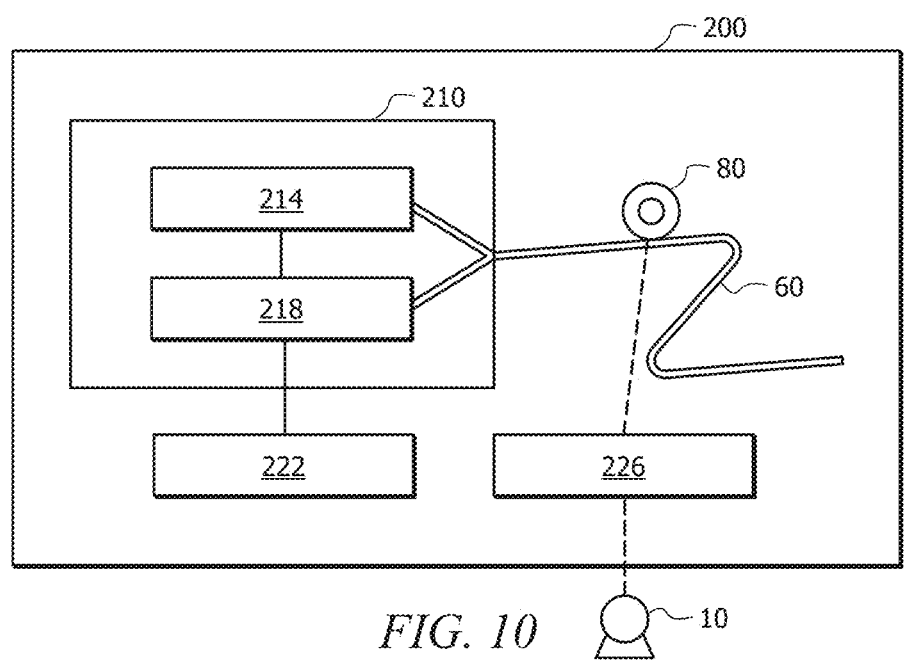
FIG. 10 illustrates a block diagram of an exemplary sensing system in accordance with embodiments of the present disclosure.

FIG. 10 illustrates a block diagram of an exemplary sensing system 200 in accordance with embodiments of the present disclosure. Embodiments of the present disclosure may employ a waveguide-based DAS system 200 to record signals, such as acoustic signals, generated by fluid flow associated with the presence of hydrocarbon reservoirs. In some embodiments, the DAS system 200 may be coupled to the waveguide 60 comprising a plurality of receiving sensors (e.g., acoustic and/or seismic sensors) such as fiber-optic sensors, geophones, optical hydrophones, accelerometers, fiber-optic interferometric sensors, and/or like to measure the acoustic data and the seismic data. Other types of fiber-optic sensors may include point sensors either at the surface and/or downhole. Single point or multi-point pressure and temperature sensors may be commonly used in reservoir monitoring applications, where the pressure sensors may be capable of collecting data at rates up to about 2,000 hertz (Hz) or even higher.

The fiber-optic sensing systems may operate using various sensing principles like Rayleigh scattering, Brillouin scattering, Raman scattering including but not limited to amplitude based sensing systems like, e.g., DTS systems based on Raman scattering, phase sensing based systems like, e.g., DAS systems based on interferometric sensing using, e.g., homodyne or heterodyne techniques where the system may sense phase or intensity changes due to constructive or destructive interference, strain sensing systems like DSS using dynamic strain measurements based on interferometric sensors or static strain sensing measurements using, e.g., Brillouin scattering, quasi-distributed sensors based on, e.g., Fiber Bragg Grating (FBG) where a wavelength shift is detected or multiple FBGs are used to form Fabry-Perot type interferometric sensors for phase or intensity based sensing, or single point fiber-optic sensors based on Fabry-Perot, FBG, or intensity based sensors.

True DFOS systems may operate based on, e.g., optical time domain reflectometry (OTDR) principles or optical frequency domain reflectometry (OFDR). OTDR based systems can be pulsed where one or more optical pulses may be transmitted down an optical fiber and backscattered light (Rayleigh, Brillouin, Raman, etc.) may be measured and processed. Time of flight for the optical pulse(s) can indicate where along the optical fiber the measurement is conducted. OFDR based systems operate in continuous wave (CW) mode where a tunable laser may be swept across a wavelength range, and the back scattered light can be collected and processed.

Various hybrid approaches where single point, quasi-distributed or distributed fiber-optic sensors are mixed with, e.g., electrical sensors, may also be used. The fiber-optic cable may then include optical fiber and electrical conductors. Electrical sensors may be pressure sensors based on quartz-type sensors or strain gauge based sensors or other commonly used sensing technologies. Pressure sensors, optical or electrical, may be housed in dedicated gauge mandrels or attached outside the casing in various configurations for downhole deployment or deployed conventionally at the surface well head or flow lines.

Temperature measurements from, e.g., a DTS system may be used to determine locations for water injection applications where fluid inflow in the treatment well as the fluids from the surface are likely to be cooler than formation temperatures. DTS warm-back analyses can be used to determine fluid volume placement and can often be conducted for water injection wells and the same technique can be used for fracturing fluid placement. Temperature measurements in observation wells can be used to determine fluid communication between the treatment well and observation well, or to determine formation fluid movement.

FBG based systems may also be used for a number of different measurements. FBG systems may be partial reflectors that can be used as temperature and strain sensors, or can be used to make various interferometric sensors with very high sensitivity. FBG systems can be used to make point sensors or quasi-distributed sensors where these FBG based sensors can be used independently or with other types of fiber-optic based sensors. FBG systems can be manufactured into an optical fiber at a specific wavelength, and other system like DAS, DSS or DTS systems may operate at different wavelengths in the same fiber and measure different parameters simultaneously as the FBG based systems using wavelength division multiplexing (WDM) and/or time division multiplexing (TDM).

The sensors can be placed in either the treatment well or observation well(s) to measure well communication. The treatment well pressure, rate, proppant concentration, diverters, fluids and chemicals may be altered to change the hydraulic fracturing treatment. These changes may impact the formation responses in several different ways, e.g.: stress fields may change, and this may generate microseismic effects that can be measured with DAS systems and/or single point seismic sensors like geophones; fracture growth rates may change and this can generate changes in measured microseismic events and event distributions over time, or changes in measured strain using the low frequency portion or the DAS signal or Brillouin based sensing systems; pressure changes due to poroelastic effects may be measured in the monitoring well; pressure data may be measured in the treatment well and correlated to formation responses; and various changes in treatment rates and pressure may generate events that can be correlated to fracture growth rates.

FIG. 10 shows a particular configuration of components of a sensing system 200, such as a DAS system 200. However, any suitable configurations of components may be used. The DAS system 200 may be inclusive of an interrogator 210 and the waveguide 60 coupled thereto.

While the DAS system 200 generally indicates a fiber-optic DAS system and the interrogator 210 show a light source 214 indicating a fiber-optic interrogator or a fiber-optic sensing system, a person skilled in the art understands that any combination of optical and/or electrical sensors, and electrical and/or optical interrogators fall within the scope of the present embodiments. In such implementations, the waveguide 60 may be attached to an electric sensor and an electrical interrogator to collect acoustic data comprising acoustic signals with a receiver 218.

Additionally, within the DAS system 200, the interrogator 210 including the receiver 218 may be connected to a processor 222 through connection, which may be wired and/or wireless. It should be noted that both processor 222 and the DAS system 200 may be disposed on a fixed platform. The processor 222 may be a part of the DAS system 200 or a separate processing unit disposed on a fixed platform. The processor 222 may be in communication with a controller 226, which in turn can communicate with the fluid displacement device 10 and/or excess inventory 80. In this manner, data obtained from the waveguide 60 can be processed and control the output of the fluid displacement 10 and/or the release of waveguide 60 from the excess inventory 80.

Both systems and methods of the present disclosure may be implemented, at least in part, with processor 222. The processor 222 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. The processor 222 may include random access memory (RAM), one or more processing resources such as a central processing unit (CPU) or hardware or software control logic, read-only memory (ROM), and/or other types of nonvolatile memory. Additional components of the processor 222 may include one or more disk drives, one or more network ports for communication with external devices as well as an input device (e.g., keyboard, mouse, etc.), and video display. The processor 222 may also include one or more buses operable to transmit communications between the various hardware components.

Alternatively, systems and methods of the present disclosure may be implemented, at least in part, with non-transitory computer-readable media. Non-transitory computer-readable media may include any instrumentality or aggregation of instrumentalities that may retain data and/or instructions for a period of time. Non-transitory computer-readable media may include, for example, storage media such as a direct access storage device (e.g., a hard disk drive or floppy disk drive), a sequential access storage device (e.g., a tape disk drive), compact disk, compact disc-read only memory (CD-ROM), digital versatile disc (DVD), RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

In some examples, the DAS system 200 may interrogate the waveguide 60 using coherent radiation and relies on interference effects to detect seismic disturbances on the waveguide 60. For example, a mechanical strain on a section of optical fiber can modify the optical path length for scattering sites on the waveguide 60, and the modified optical path length can vary the phase of the backscattered optical signal. The phase variation can cause interference among backscattered signals from multiple distinct sites along the length of the waveguide 60 and thus affect the intensity and/or phase of the optical signal detected by the DAS system 200. In some instances, the seismic disturbances on the waveguide 60 are detected by analysis of the intensity and/or phase variations in the backscattered signals.

The waveguide 60 can detect acoustic and other data that can be converted to flow data. In some embodiments, the waveguide 60 may be a fiber-optic sensing cable, telecommunications cable, an electrical cable, an umbilical cable, a flowline cable, or an array of optical/electrical hydrophones. A fiber-optic cable may house one or several optical fibers and the optical fibers may be single mode fibers, multi-mode fibers or a combination of a single mode and multi-mode optical fibers. The fiber-optic sensing systems, discussed herein, connected to the optical fibers may include DTS systems, DAS Systems, DSS Systems, quasi-distributed sensing systems where multiple single point sensors are distributed along an optical fiber or cable, or single point sensing systems where the sensors are located at the end of the cable.

The waveguide 60 can include a plurality of acoustic sensors to record acoustic signals. The DAS interrogator 210 may comprise the light source 214 (e.g., a laser) that is configured to emit a plurality of coherent light frequencies into the waveguide 60 and the receiver 218 to receive backscattered light from the plurality of receiving sensors of the waveguide 60.

In some embodiments, the interrogator 210 may be a part of a DAS system or any other electrical or optical interrogation unit, coupled with the waveguide 60 deployed in the fluid path, and configured to continuously measure and record real-time acoustic signals from the fluid flow. Particularly in some embodiments, the DAS system may comprise one or more DAS interrogators 210 and waveguides 60. The DAS interrogator 210 may have an internal selection of fixed length waveguides 60 that are used to generate interference measurements out of the reflected signals returning from a waveguide 60 under measurement. Each of these waveguides 60 may be used as an option to adjust the gauge length. Accordingly, to the disclosed methods herein, the DAS interrogator 210 may employ a waveguide switch to select a desired length optical fiber among the optical fibers for adjusting the gauge length based on the interference measurements and placing the desired gauge length fiber in the measurement circuit. The fiber-optic switch may comprise a software-controlled microelectromechanical system (MEMS) device or any other suitable optical switch. Thus, the disclosed methods provide the DAS interrogator to continually switch among a set of gauge lengths in the DAS interrogator during the acquisition to enhance sensitivity and to optimize signal-to-noise ratio (SNR) in real-time.

In some embodiments, in a hydraulic fracturing environment, a hydraulic fracturing process may include pumping a treatment fluid into a wellbore at a known rate through perforations into a subterranean formation. The DAS system may measure data about strain signals generated by the treatment fluid moving through the formation. The methods described herein may employ real-time calculation of positions of the treatment fluid in the formation, which may be used to determine characteristics (e.g., a size and a location) of fractures formed during the hydraulic fracturing process. As an example, use of smaller gauge lengths may allow for more accurate interpretation of the signals (including the location and the size of the fractures and strain sources) when the fractures are close to the fiber and the signals are large. This provides an operator with real-time access to DAS measurements and the ability to adjust DAS system settings and fracturing parameters on the fly to account for varying signal conditions. In this way, employing dynamic gauge length adjustment may enable early signal detection results (e.g., analysis of fluid location) and provide more time for the treatment plan to react to a potential well hit while also potentially enabling monitoring of smaller sources such as production.

DAS data can be used to determine fluid allocation in real-time as acoustic noise is generated when fluid flows through the casing and in through perforations into the formation. Phase and intensity based interferometric sensing systems can be sensitive to temperature and mechanical as well as acoustically induced vibrations. DAS data can be converted from time series date to frequency domain data using Fast Fourier Transforms (FFT) and other transforms like wavelet transforms may also be used to generate different representations of the data. Various frequency ranges can be used for different purposes and where, e.g., low frequency signal changes may be attributed to formation strain changes or temperature changes due to fluid movement and other frequency ranges may be indicative of fluid or gas movement. Various filtering techniques and models may be applied to generate indicators of events that may be of interest. Indicators may include formation movement due to growing natural fractures, formation stress changes during the fracturing operations (also be called stress shadowing), fluid seepage during the fracturing operation as formation movement may force fluid into an observation well, fluid flow from fractures, and fluid and proppant flow from fracture hits. Each indicator may have a characteristic signature in terms of frequency content, amplitude and/or time dependent behavior. These indicators may also be present at other data types and not limited to DAS data. Fiber-optic cables used with DAS systems may include enhanced back scatter optical fibers where the Rayleigh backscatter may be increased by about 10 times or more with an associated increase in optical signal-to-noise ratio (OSNR).

DAS systems can also be used to detect various seismic events where stress fields and/or growing fracture networks generate microseismic events or where perforation charge events may be used to determine travel time between horizontal wells and this information can be used from stage-to-stage to determine changes in travel time as the formation is fractured and filled with fluid and proppant. The DAS systems may also be used with surface seismic sources to generate vertical seismic profiles (VSPs) before, during, and after a fracturing job to determine fracturing and production effectiveness. VSPs and reflection seismic surveys may be used over the life of a well and/or reservoir to track production related depletion and/or track, e.g., water, gas, and polymer flood fronts.

DSS data can be generated using various approaches and static strain data can be used to determine absolute strain changes over time. Static strain data is often measured using Brillouin based systems or quasi-distributed strain data from a FBG based system. Static strain may also be used to determine propped fracture volume by analyzing deviations in strain data from a measured strain baseline prior to fracturing. Other formation properties may be determined such as permeability, poroelastic responses, and leak-off rates based on the change of strain versus time and the rate at which the strain changes over time. Dynamic strain data can be used in real-time to detect fracture growth through an appropriate inversion model, and appropriate actions like dynamic changes to fluid flow rates in the treatment well, the addition of diverters or chemicals into the fracturing fluid, or changes to proppant concentrations or types can then be used to mitigate detrimental effects.

In some embodiments, the SNR optimization may include data-driven or machine learning type models for managing multiple sensing systems and data sets in different environments (e.g., regions, basins, reservoirs, layers, drilling info, etc.). The model may predict the DAS signals from an assumed set of hydraulic fractures or strain sources in the formation and use the results to optimize the fracturing parameters. The model may be a machine learning model, a data-driven model, a physics-based model, or a hybrid model.

Several measurements can be combined to determine distributed flow in subsurface wells. Multiple wells in a field and/or reservoir may be instrumented with optical fibers for monitoring subsurface reservoirs from initial operation to operation cessation. Subsurface applications may include hydrocarbon extraction, geothermal energy production and/or fluid injection such as water or carbon dioxide in a carbon capture, utilization, and storage application.

ADDITIONAL DISCLOSURE

The following are non-limiting, specific embodiments in accordance with the present disclosure:

A first embodiment, which is a method, comprises detecting one or more properties of a waveguide having a downhole end and an uphole end; and responsive to the detected one or more properties, positioning into a passage of a wellbore the waveguide while minimizing a tension thereof.

A second embodiment, which is the method of the first embodiment, wherein the one or more waveguide properties comprises dynamic strain, peak tension, distributed tension, waveguide velocity, waveguide acceleration, or a combination thereof.

A third embodiment, which is the method of any of the first and the second embodiments, further comprising receiving signals of the detected one or more properties at a sensing system, wherein the sensing system comprises: a processor; and a controller, wherein the controller sends instructions to regulate positioning of the waveguide in the wellbore to minimize damage thereof.

A fourth embodiment, which is the method of any of the first through the third embodiments, wherein one or more waveguide properties are detected with at least one of a strain gauge, a fiber Bragg grating (FBG) inline sensor, distributed strain sensing, or distributed acoustic sensing.

A fifth embodiment, which is the method of any of the first through the fourth embodiments, wherein one or more waveguide properties are detected by using at least one of Rayleigh scattering or Brillouin scattering.

A sixth embodiment, which is the method of any of the first through the fifth embodiments, wherein the waveguide is coupled to a dart adjacent to the downhole end and a waveguide conveyor adjacent to the uphole end or the downhole end; the passage comprises a substantially vertical portion having a heel and a substantially horizontal portion having a toe; and the dart is positioned at a first location, a second location, or a third location in the passage.

A seventh embodiment, which is the method of any of the first through the sixth embodiments, further comprising positioning the waveguide conveyor by controlling a speed of a fluid displacement device between a minimum and a maximum velocity for reducing tension in the waveguide.

An eighth embodiment, which is the method of any of the first through the seventh embodiments, further comprising positioning the waveguide conveyor by controlling an acceleration of a fluid displacement device between a minimum and a maximum acceleration for reducing tension in the waveguide.

A ninth embodiment, which is the method of any of the first through the eighth embodiments, wherein the fluid displacement device comprises an electric pump including a variable frequency drive.

A tenth embodiment, which is the method of any of the first through the ninth embodiments, further comprising a second inventory of waveguide, and releasing at least a portion of the second inventory to create slack in the waveguide.

An eleventh embodiment, which is the method of any of the first through the tenth embodiments, further comprising interrogating the waveguide for detecting one or more properties of the waveguide.

A twelfth embodiment, which is the method of any of the first through the eleventh embodiments, wherein positioning of the waveguide comprises installing the waveguide in the passage.

A thirteenth embodiment, which is the method of any of the first through the twelfth embodiments, wherein the dart is positioned at the first location within the substantially vertical portion of the passage.

A fourteenth embodiment, which is the method of any of the first through the thirteenth embodiments, further comprising detecting one or more properties of the waveguide at the substantially vertical portion thereof.

A fifteenth embodiment, which is the method of any of the first through the fourteenth embodiments, further comprising detecting one or more properties of the waveguide at a fiber coil of the waveguide conveyor.

A sixteenth embodiment, which is the method of any of the first through the fifteenth embodiments, wherein the dart is positioned at the second location within the substantially horizontal portion of the passage.

A seventeenth embodiment, which is the method of any of the first through the sixteenth embodiments, further comprising detecting one or more properties of the waveguide at a substantially vertical portion of the passage.

An eighteenth embodiment, which is the method of any of the first through the seventeenth embodiments, further comprising detecting one or more properties of the waveguide at the heel of the wellbore.

A nineteenth embodiment, which is the method of any of the first through the eighteenth embodiments, further comprising detecting one or more properties of the waveguide at the second location past the heel and before a turbulent region created by a waveguide conveyor.

A twentieth embodiment, which is the method of any of the first through the nineteenth embodiments, further comprising detecting the one or more properties from a portion of the waveguide in a turbulent region behind the waveguide conveyor.

A twenty-first embodiment, which is the method of any of the first through the twentieth embodiments, further comprising detecting the one or more properties from another portion of the waveguide being deployed (e.g., unspooled) at the waveguide conveyor.

A twenty-second embodiment, which is the method of any of the first through the twenty-first embodiments, further comprising detecting the one or more properties of the waveguide at a fiber coil at the waveguide conveyor.

A twenty-third embodiment, which is the method of any of the first through the twenty-second embodiments, wherein a slack is created in the waveguide prior to darting by reversing fluid flow from a fluid displacement device (e.g., pump).

A twenty-fourth embodiment, which is the method of any of the first through the twenty-third embodiments, wherein the dart is positioned at the third location at the toe of the passage.

A twenty-fifth embodiment, which is the method of any of the first through the twenty-fourth embodiments, further comprising releasing additional waveguide from the waveguide conveyor after positioning the dart to create slack in the waveguide.

A twenty-sixth embodiment, which is the method of any of the first through the twenty-fifth embodiments, further comprising a second inventory of waveguide at the surface, and releasing at least a portion of the second inventory to create slack in the A twenty-seventh embodiment, which is the method of any of the first through the twenty-sixth embodiments, further comprising detecting one or more properties of a portion of the waveguide adjacent the heel.

A twenty-eighth embodiment, which is a method, comprises deploying a fiber optic within a wellbore; while deploying, interrogating the fiber optic to determine one or more parameters of the fiber optic; and responsive to the one or more parameters, controlling the deploying of the fiber optic.

A twenty-ninth embodiment, which is the method of the twenty-eighth embodiment, wherein the one or more parameters comprise dynamic strain, peak tension, distributed tension, waveguide velocity, waveguide acceleration, or a combination thereof.

A thirtieth embodiment, which is the method of any of the twenty-eighth and the twenty-ninth embodiments, wherein the controlling comprises adjusting a deployment rate of the fiber optic in the wellbore with a fluid deployment device.

A thirty-first embodiment, which is the method of any of the twenty-eighth through the thirtieth embodiments, wherein the controlling comprises adjusting a rate of movement (e.g., velocity or speed in units of length per time) of the fiber optic in the wellbore with a fluid deployment device.

A thirty-second embodiment, which is the method of any of the twenty-eighth through the thirty-first embodiments, wherein, after deployment, introducing slack into the fiber optic within the wellbore.

A thirty-third embodiment, which is the method of any of the twenty-eighth through the thirty-second embodiments, further comprising deploying the waveguide conveyor by controlling an acceleration of a fluid displacement device (e.g., pump) between a minimum and a maximum acceleration.

A thirty-fourth embodiment, which is the method of any of the twenty-eighth through the thirty-third embodiments, wherein the fluid displacement device comprises an electric pump including a variable frequency drive.

A thirty-fifth embodiment, which is the method of any of the twenty-eighth through the thirty-fourth embodiments, further comprising receiving signals of detected one or more properties at a sensing system, wherein the sensing system comprises: a processor; and a controller, wherein the controller sends instructions to regulate positioning of the waveguide in the wellbore to minimize damage thereof.

A thirty-sixth embodiment, which is the method of any of the twenty-eighth through the thirty-fifth embodiments, wherein one or more waveguide properties are detected with at least one of a strain gauge, a fiber Bragg grating (FBG) inline sensor, distributed strain sensing, or distributed acoustic sensing.

A thirty-seventh embodiment, which is the method of any of the twenty-eighth through the thirty-sixth embodiments, wherein one or more waveguide properties are detected by using at least one of Rayleigh scattering or Brillouin scattering.

A thirty-eighth embodiment, which is the method of any of the twenty-eighth through the thirty-seventh embodiments, wherein the waveguide is coupled to a dart adjacent to the downhole end and a waveguide conveyor adjacent to the uphole end or the downhole end; the passage comprises a substantially vertical portion having a heel and a substantially horizontal portion having a toe; and the dart is positioned at a first location, a second location, or a third location in the passage.

A thirty-ninth embodiment, which is the method of any of the twenty-eighth through the thirty-eighth embodiments, wherein a dart is positioned at the first location within the substantially vertical portion of the passage.

A fortieth embodiment, which is the method of any of the twenty-eighth through the thirty-ninth embodiments, further comprising detecting one or more properties of the waveguide at the substantially vertical portion thereof.

A forty-first embodiment, which is the method of any of the twenty-eighth through the fortieth embodiments, further comprising detecting one or more properties of the waveguide at a fiber coil of the waveguide conveyor.

A forty-second embodiment, which is the method of any of the twenty-eighth through the forty-first embodiments, wherein the dart is positioned at the second location within the substantially horizontal portion of the passage.

A forty-third embodiment, which is the method of any of the twenty-eighth through the forty-second embodiments, further comprising detecting one or more properties of the waveguide at a substantially vertical portion of the passage.

A forty-fourth embodiment, which is the method of any of the twenty-eighth through the forty-third embodiments, further comprising detecting one or more properties of the waveguide at the heel of the wellbore.

A forty-fifth embodiment, which is the method of any of the twenty-eighth through the forty-fourth embodiments, further comprising detecting one or more properties of the waveguide at the second location past the heel and before a turbulent region created by a waveguide conveyor.

A forty-sixth embodiment, which is the method of any of the twenty-eighth through the forty-fifth embodiments, further comprising detecting the one or more properties from a portion of the waveguide in a turbulent region behind the waveguide conveyor.

A forty-seventh embodiment, which is the method of any of the twenty-eighth through the forty-sixth embodiments, further comprising detecting the one or more properties from another portion of the waveguide being deployed (e.g., unspooled) at the waveguide conveyor.

A forty-eighth embodiment, which is the method of any of the twenty-eighth through the forty-seventh embodiments, further comprising detecting the one or more properties of the waveguide at a fiber coil at the waveguide conveyor.

A forty-ninth embodiment, which is the method of any of the twenty-eighth through the forty-eighth embodiments, wherein a slack is created in the waveguide prior to darting by reversing fluid flow from a fluid displacement device (e.g., pump).

A fiftieth embodiment, which is the method of any of the twenty-eighth through the forty-ninth embodiments, wherein the dart is positioned at the third location at the toe of the passage.

A fifty-first embodiment, which is the method of any of the twenty-eighth through the fiftieth embodiments, further comprising releasing additional waveguide from the waveguide conveyor after positioning the dart to create slack in the waveguide.

A fifty-second embodiment, which is the method of any of the twenty-eighth through the fifty-first embodiments, further comprising a second inventory of waveguide at the surface, and releasing at least a portion of the second inventory to create slack in the A fifty-third embodiment, which is the method of any of the twenty-eighth through the fifty-second embodiments, further comprising detecting one or more properties of a portion of the waveguide adjacent the heel.

A fifty-fourth embodiment, which is a method of deploying a waveguide positioned in a wellbore, comprises: (a) conveying the waveguide (e.g., fiber optic) the wellbore via a conveyance; (b) detecting one or more waveguide properties during the conveying (a); and (c) responsive to the detected properties of (b), controlling tension in the waveguide during the conveying (a).

A fifty-fifth embodiment, which is the method of the fifty-fourth embodiment, wherein the controlling (c) further comprises adjusting a rate of movement (e.g., speed/velocity) of the conveyance.

A fifty-sixth embodiment, which is the method of any of the fifty-fourth embodiment and the fifty-fifth embodiments, wherein the conveyance comprises a pump, a tractor, a coiled tubing, or combinations thereof.

A fifty-seventh embodiment, which is the method of any of the fifty-fourth through the fifty-sixth embodiments, wherein the one or more waveguide properties are detected while the waveguide is being conveyed by gravity into a vertical portion the wellbore prior to initiating fluid flow into the wellbore.

A fifty-eighth embodiment, which is the method of any of the fifty-fourth through the fifty-seventh embodiments, wherein the one or more waveguide properties are detected while the waveguide is being conveyed by fluid flow into a horizontal portion the wellbore.

A fifty-ninth embodiment, which is the method of any of the fifty-fourth through the fifty-eighth embodiments, wherein the detecting (b) further comprises interrogating the wave guide during the conveying (a).

A sixtieth embodiment, which is the method of any of the fifty-fourth through the fifty-ninth embodiments, wherein the fluid flow includes an area of turbulent flow and the detecting (b) is performed on a portion of the waveguide located in the turbulent flow.

A sixty-first embodiment, which is the method of any of the fifty-fourth through the sixtieth embodiments, wherein the turbulent flow is produced by a waveguide conveyor coupled to a downhole end of the waveguide.

A sixty-second embodiment, which is the method of any of the fifty-fourth through the sixty-first embodiments, wherein the fluid flow is produced by an electric pump including a variable frequency drive.

A sixty-third embodiment, which is the method of any of the fifty-fourth through the sixty-second embodiments, wherein the controlling (c) comprises introducing slack into the fiber optic within the wellbore.

A sixty-fourth embodiment, which is a method of controlling the deployment of a waveguide into a wellbore, comprises: detecting one or more waveguide properties; and controlling the tension in the waveguide by regulating the rate of waveguide deployment to minimize damage thereof; wherein the one or more waveguide properties are detected during at least one of the following stages: a first stage comprising deployment of the waveguide via gravity into the wellbore prior to initiating fluid flow; a second stage comprising deployment of the waveguide with fluid flow downhole; or a third stage after deployment of the waveguide downhole.

A sixty-fifth embodiment, which is the method of the sixty-fourth embodiment, wherein the detecting properties of the waveguide during the second stage includes at least one of: detecting properties of a portion of the waveguide located adjacent a heel of the wellbore; detecting properties of a portion of the waveguide located past the heel and before a turbulent region created by a waveguide conveyor; detecting properties of a portion of the waveguide located in the turbulent region behind the waveguide conveyor; or detecting properties of a portion of the waveguide located adjacent the waveguide conveyor (e.g., a portion of the waveguide still on a spool at the surface).

A sixty-sixth embodiment, which is the method of any of the sixty-fourth embodiment and the sixty-fifth embodiments, wherein controlling the tension in the waveguide by regulating the rate of waveguide deployment further comprises controlling a rate of fluid flow into the wellbore from an electric pump.

A sixty-seventh embodiment, which is a method of minimizing damage to a waveguide during deployment in a wellbore, comprises conveying a waveguide into the wellbore; receiving, at a sensing system, signals from the waveguide during the deployment; and transmitting instructions to a controller for regulating the deployment of the waveguide to prevent damage.

A sixty-eighth embodiment, which is the method of the sixty-seventh embodiment, wherein regulating the deployment comprises controlling the speed of an electric pump.

A sixty-ninth embodiment, which is the method of any of the sixty-seventh embodiment and the sixty-eighth embodiments, wherein the deployment further comprises a first stage of conveying the waveguide via gravity and a second stage of conveying the waveguide via pumping fluid at a predetermined rate to avoid acceleration or deceleration damaging to the waveguide.

A seventieth embodiment, which is the method of any of the sixty-seventh through the sixty-ninth embodiments, wherein, further comprising interrogating the waveguide and receiving the signals at the sensing system, wherein the sensing system comprises a processor; and a controller, wherein the controller sends instructions to the fluid displacement device to regulate the flow fluid based on the detected tension exerted on the waveguide.

A seventy-first embodiment, which is the method of any of the sixty-seventh through the seventieth embodiments, wherein the waveguide is coupled at an uphole end to a waveguide conveyor comprising a spool and at a downhole end to a dart, and further comprising releasing slack in a deployed length of the waveguide.

A seventy-second embodiment, which is the method of any of the sixty-seventh through the seventy-first embodiments, wherein after setting the dart, slack is released by rotating the spool.

A seventy-third embodiment, which is the method of any of the sixty-seventh through the seventy-second embodiments, wherein prior to setting the dart, slack is released by reversing fluid flow from the pump.

A seventy-fourth embodiment, which is the method of any of the sixty-seventh through the seventy-third embodiments, wherein one or more waveguide properties are (i) detected with a strain gauge or a fiber Bragg grating (FBG) inline sensor; (ii) detected by distributed strain sensing or distributed acoustic sensing; (iii) detected by using at least one of Rayleigh scattering or Brillouin scattering; or (iv) any combination of (i), (ii), or (iii).

A seventy-fifth embodiment, which is a system for minimizing tension in a waveguide having a downhole end and an uphole end deployed in a subterranean formation, comprises: a sensing system; a waveguide inventory adjacent the uphole end of the waveguide and in communication with the sensing system; and a waveguide conveyor coupled to the downhole end of the waveguide, wherein the sensing system is configured to (i) receive a signal regarding one or more properties of the waveguide, and (ii) responsive to the one or more properties, controlling the positioning of the waveguide to minimize damage thereof.

A seventy-sixth embodiment, which is the method of the seventy-fifth embodiment, further comprising an electric pump in fluid communication with the wellbore and in signal communication with the sensing system.

A seventy-seventh embodiment, which is the method of any of the seventy-fifth embodiment and the seventy-sixth embodiments, wherein the sensing system receives Rayleigh scattering signals, Brillouin scattering signals, or acoustic strain signals.

A seventy-eighth embodiment, which is the method of any of the seventy-fifth through the seventy-seventh embodiments, wherein the waveguide inventory comprises sufficient waveguide for creating slack in the deployed waveguide.

A seventy-ninth embodiment, which is the method of any of the seventy-fifth through the seventy-eighth embodiments, An eightieth embodiment, which is the method of any of the seventy-fifth through the seventy-ninth embodiments, wherein the sensing system comprises a processor, a controller, and an interrogator.

An eighty-first embodiment, which is the method of any of the seventy-fifth through the eightieth embodiments, wherein the waveguide conveyor comprises a dart coupled to one or more swell cups.

An eighty-second embodiment, which is the method of any of the seventy-fifth through the eighty-first embodiments, wherein the waveguide comprises at least one of a strain gauge or a fiber Bragg grating (FBG) inline sensor.

An eighty-third embodiment, which is a system for minimizing damage to a waveguide having a downhole end and an uphole end deployed in a subterranean formation, comprises: a sensing system; a waveguide inventory adjacent the uphole end of the waveguide and in communication with the sensing system; and a waveguide conveyor coupled to the downhole end of the waveguide, wherein the sensing system is configured to (i) receive a signal regarding one or more properties of the waveguide, and (ii) responsive to the one or more properties, controlling the deployment of the waveguide to minimize damage thereof.

An eighty-fourth embodiment, which is the method of the eighty-third embodiment, further comprising an electric pump in fluid communication with the wellbore and in signal communication with the sensing system.

An eighty-fifth embodiment, which is the method of any of the eighty-third embodiment and the eighty-fourth embodiments, wherein the sensing system receives Rayleigh scattering signals, Brillouin scattering signals, or acoustic strain signals.

An eighty-sixth embodiment, which is the method of any of the eighty-third through the eighty-fifth embodiments, wherein the waveguide inventory comprises sufficient waveguide for creating slack in the deployed waveguide.

An eighty-seventh embodiment, which is the method of any of the eighty-third through the eighty-sixth embodiments, wherein the sensing system comprises a processor, a controller, and an interrogator.

An eighty-eighth embodiment, which is the method of any of the eighty-third through the eighty-seventh embodiments, wherein the waveguide conveyor comprises a dart coupled to one or more swell cups and a dart.

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. Use of the term "optionally" with respect to any element of a claim is intended to mean that the subject element may be present in some embodiments and not present in other embodiments. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application. The disclosures of all patents, patent applications, and publications cited herein are hereby incorporated by reference, to the extent that they provide exemplary, procedural, or other details supplementary to those set forth herein.

We claim:

1. A method, comprising:
   detecting, using an interrogator of a distributed acoustic sensing system, one or more properties of a waveguide having a downhole end and an uphole end; and
   responsive to the detected one or more properties, positioning into a passage of a wellbore the waveguide while minimizing a tension thereof,
   wherein the passage comprises a vertical portion having a heel and a horizontal portion having a toe,
   wherein the detecting comprising detecting, using the interrogator of the distributed acoustic sensing system, the one or more properties of the waveguide while the waveguide is being conveyed by fluid flow into the vertical portion and the horizontal portion, and
   wherein the waveguide is positioned in the horizontal portion at a constant fluid flow rate by controlling a speed of a fluid displacement device to minimize change in velocity and/or acceleration of the waveguide as the waveguide transitions from a gravity-based deployment to a fluid-propelled deployment.

2. The method of claim 1, wherein the one or more waveguide properties comprises dynamic strain, peak tension, distributed tension, waveguide velocity, waveguide acceleration, or a combination thereof.

3. The method of claim 1, further comprising receiving signals of the detected one or more properties at a sensing system, wherein the sensing system comprises:
   a processor; and
   a controller, wherein the controller sends instructions to regulate positioning of the waveguide in the wellbore to minimize damage thereof.

4. The method of claim 1, wherein one or more waveguide properties are detected with at least one of a strain gauge, a fiber Bragg grating (FBG) inline sensor, distributed strain sensing, or distributed acoustic sensing.

5. The method of claim 1, wherein one or more waveguide properties are detected by using at least one of Rayleigh scattering or Brillouin scattering.

6. The method of claim 1, wherein the waveguide is coupled to a dart adjacent to the downhole end and a waveguide conveyor adjacent to the uphole end or the downhole end, and wherein the dart is positioned at a first location, a second location, or a third location in the fluid flow path.

7. The method of claim 1, further comprising positioning a waveguide conveyor by controlling the speed of the fluid displacement device between a minimum and a maximum velocity for reducing tension in the waveguide.

8. The method of claim 7, wherein the fluid displacement device comprises an electric pump including a variable frequency drive.

9. The method of claim 1, further comprising positioning a waveguide conveyor by controlling an acceleration of the fluid displacement device between a minimum and a maximum acceleration for reducing tension in the waveguide.

10. The method of claim 1, further comprising a second inventory of waveguide, and releasing at least a portion of the second inventory to create slack in the waveguide.

11. A method comprising:
    deploying a fiber optic within a wellbore;

while deploying, interrogating, using an interrogator of a distributed acoustic sensing system, the fiber optic to determine one or more parameters of the fiber optic; and responsive to the one or more parameters, controlling the deploying of the fiber optic into a passage of the wellbore, and wherein the interrogating comprising interrogating, using the interrogator of the distributed acoustic sensing system, the one or more parameters of the fiber optic while the fiber optic is being conveyed by fluid flow into the vertical portion and the horizontal portion, and wherein the fiber optic is positioned in the horizontal portion at a constant fluid flow rate by controlling a speed of a fluid displacement device to minimize change in velocity and/or acceleration of the fiber optic as the fiber optic transitions from a gravity-based deployment to a fluid-propelled deployment.

12. The method of claim 11 wherein the one or more parameters comprise dynamic strain, peak tension, distributed tension, waveguide velocity, waveguide acceleration, or a combination thereof.

13. The method of claim 11 wherein the controlling comprises adjusting a deployment rate of the fiber optic in the wellbore with the fluid deployment device.

14. A system for minimizing tension in a waveguide having a downhole end and an uphole end deployed in a subterranean formation, comprising:

a sensing system comprising an interrogator;
a waveguide inventory adjacent the uphole end of the waveguide and in communication with the sensing system; and
a waveguide conveyor coupled to the downhole end of the waveguide, wherein the sensing system is configured to (i) receive a signal regarding one or more properties of the waveguide, and (ii) responsive to the one or more properties, controlling the positioning of the waveguide into a passage of a wellbore to minimize damage thereof, wherein the passage comprises a vertical portion having a heel and a horizontal portion having a toe, wherein the one or more properties of the waveguide are determined using the interrogator while the waveguide is being conveyed by fluid flow into the vertical portion and the horizontal portion, and wherein the waveguide is positioned in the horizontal portion at a constant fluid flow rate by controlling a speed of a fluid displacement device to minimize change in velocity and/or acceleration of the waveguide as the waveguide transitions from a gravity-based deployment to a fluid-propelled deployment.

15. The system of claim 14, further comprising an electric pump in fluid communication with the wellbore and in signal communication with the sensing system.

16. The system of claim 14, wherein the sensing system receives Rayleigh scattering signals, Brillouin scattering signals, or acoustic strain signals.

17. The system of claim 14, wherein the waveguide inventory comprises sufficient waveguide for creating slack in the deployed waveguide.

18. The system of claim 14, wherein the sensing system further comprises a processor and a controller.

19. The system of claim 14, wherein the waveguide conveyor comprises a dart coupled to one or more swell cups.

20. The system of claim 14, wherein the waveguide comprises at least one of a strain gauge or a fiber Bragg grating (FBG) inline sensor.

* * * * *